(12) United States Patent
Scheffel

(10) Patent No.: US 7,424,076 B2
(45) Date of Patent: Sep. 9, 2008

(54) SYSTEM AND METHOD FOR PROVIDING SYNCHRONIZATION INFORMATION TO A RECEIVER

(75) Inventor: Klaus Scheffel, Kaarst (DE)

(73) Assignee: Nokia Corporation, Espoo (FI)

( * ) Notice: Subject to any disclaimer, the term of this patent is extended or adjusted under 35 U.S.C. 154(b) by 503 days.

(21) Appl. No.: 10/804,168

(22) Filed: Mar. 19, 2004

(65) Prior Publication Data

US 2005/0163273 A1    Jul. 28, 2005

(30) Foreign Application Priority Data

Jan. 22, 2004    (EP)    .................... 04001345

(51) Int. Cl.
*H04L 7/00* (2006.01)
*H04L 7/02* (2006.01)

(52) U.S. Cl. ...................... 375/356; 375/362
(58) Field of Classification Search ................ 375/356, 375/359, 362, 371, 373
See application file for complete search history.

(56) References Cited

U.S. PATENT DOCUMENTS

| | | | |
|---|---|---|---|
| 5,260,978 A | 11/1993 | Fleischer et al. | |
| 5,790,608 A * | 8/1998 | Benayoun et al. | 375/356 |
| 6,275,549 B1 * | 8/2001 | Greatwood et al. | 375/356 |
| 6,917,656 B2 * | 7/2005 | Fuhrmann et al. | 375/355 |
| 7,106,224 B2 * | 9/2006 | Knapp et al. | 341/61 |
| 7,116,686 B2 * | 10/2006 | Van Der Putten et al. | 370/503 |
| 2001/0038646 A1 | 11/2001 | Van Der Putten et al. | |

FOREIGN PATENT DOCUMENTS

EP    0 718 995 A1    6/1996

\* cited by examiner

*Primary Examiner*—Chieh M. Fan
*Assistant Examiner*—Jason M. Perilla
(74) *Attorney, Agent, or Firm*—Squire, Sanders & Dempsey, L.L.P.

(57) ABSTRACT

The invention provides a method and system for synchronizing a transmitter and a receiver wherein the transmitter generates phase difference information indicating a phase difference between an internal and an external clock, the phase difference information is transmitted to the receiver, and the receiver generates a clock signal dependent on the transmitted phase difference information.

26 Claims, 4 Drawing Sheets

AP Phase Information Generation

Principle Transmission and Reception Timing Sequence of AP and AT pulses

Receiver Block Diagram

Timing Diagram with Decreasing Frame Pulse Difference

Timing Diagram with Increasing Frame Pulse Difference

SYSTEM AND METHOD FOR PROVIDING SYNCHRONIZATION INFORMATION TO A RECEIVER

FIELD AND BACKGROUND OF THE INVENTION

The present invention relates to a system and method for synchronization within a communication network, in particular between a sender and a receiver. The invention provides transfer of phase information, preferably but not exclusively by transfer of phase, e.g. absolute synchronization input phase, within one or more packets, e.g. multicast packets.

In TDM traffic the synchronization is transferred via the carrier itself (optical systems) or under use of a dedicated timeslot. However this demands for a continuous data transmission.

Synchronizing the carrier to an external clock source requires heavy filtering of the external clock in order not to violate the carrier clock jitter requirements. The exact time when a packet is sent cannot be predicted beforehand, because it is depending on the existing data queues.

Transfer of synchronization information over packet networks may be effected with timestamps which are transmitted every 50 ms+/−3 ms. The information is sent very seldom and the delay jitter is large. Consequently the filter times at the destination point are extremely long (up to several hours). In principle this is not feasible for packet based radio transmission.

U.S. Pat. No. 5,260,978 provides a Residual Time Stamp (RTS) technique for recovering the timing signal of a constant bit rate input service signal at the destination node of a synchronous ATM telecommunication network. At the source node, a free-running P-bit counter counts cycles in a common network clock. The current count of the P-bit counter, defined as the RTS, is transmitted in the ATM adaptation layer. At the destination node, a pulse signal is derived in which the periods are determined by the number of network clock cycles represented by the received RTSs. This pulse signal is then multiplied in frequency by N to recover the source node service clock.

SUMMARY OF THE INVENTION

The invention intends to solve the above problems and provides, according to one aspect, a method as defined in the independent method claim or any one of the dependent method claims.

According to a further aspect, the invention provides a system as defined in the independent system claim or any one of the dependent system claims.

Further, the invention provides a transmitter and receiver device as defined in the transmitter and receiver claims.

This invention proposes a method and system for transfer of phase information, e.g. absolute phase information, with packets, e.g. transfer of absolute synchronization input phase within at least one e.g. point-to-point packet or multicast packet or generally broadcast packet. The phase difference information may for instance be a phase difference value such as a numerical value.

In accordance with an exemplary aspect of the invention, the phase difference between an internal clock and an external clock signal, e.g. of a transmitter, is transmitted over the link. Based on the transmitted phase difference, the phase of the external signal can be regenerated in the other end, e.g. the receiving station such as mobile equipment or terminal. The information may be transferred to the receiving end e.g. using at least one packet or message.

With this invention it is not necessary to synchronize the carrier reference to the external synchronization source. Furthermore filtering of the clock source is not needed, because the incoming phase is measured at the near end radio. The measured data are then transferred to the far-end and reconstructed there.

The invention allows frequency synchronization to be transferred over packet based radio link. Implementation is relatively easy compared to other techniques of synchronization. The invention is not limited to point-to-multipoint, but can also be used in packet based point-to-point connection or general information broadcast.

The invention is useful e.g. for all packet transporting systems or radios (e.g. ATM and IP), where synchronization information is to be, or should be transferred.

The invention therefore provides a method for synchronizing a transmitter and a receiver. The method comprises the steps of generating, by the transmitter, phase difference information indicating a phase difference between an internal clock and an external clock; transmitting, by the transmitter, the phase difference information to the receiver; and generating, by the receiver, a clock signal dependent on the transmitted phase difference information.

The invention also provides a system for synchronizing a transmitter and a receiver, the system comprises: a transmitter comprising a phase difference information generating means for generating phase difference information indicating a phase difference between an internal clock and an external clock, and transmitting means for transmitting the phase difference information to the receiver; and a receiver comprising a clock generator means for generating a clock signal dependent on the transmitted phase difference information.

The invention further provides a transmitter used in a system for synchronizing a transmitter and a receiver, wherein the receiver comprises a clock generator means for generating a clock signal dependent on the transmitted phase difference information, the transmitter comprising: a phase difference generating means for generating phase difference information indicating a phase difference between an internal clock and an external clock; and a transmitting means for transmitting the phase difference information to a receiver.

The invention further provides a receiver used in a system for synchronizing a transmitter and a receiver, wherein the transmitter comprises a phase difference generating means for generating phase difference information indicating a phase difference between an internal clock and an external clock and means for transmitting the phase difference information to the receiver, the receiver comprising: a clock generator means for generating a clock signal dependent on a phase difference information transmitted from a transmitter.

The invention further provides a method for synchronizing a transmitter and a receiver wherein the receiver generates a clock signal dependent on a transmitted phase difference information. The method comprises the steps of generating, by a transmitter, phase difference information indicating a phase difference between an internal clock and an external clock; and transmitting, by the transmitter, the phase difference information to the receiver.

The invention further provides a method for synchronizing a transmitter and a receiver wherein the transmitter generates phase difference information indicating a phase difference between an internal clock and an external clock. The method comprises the step of generating, by the receiver, a clock signal dependent on a transmitted phase difference information indicating a phase difference between the internal and the external clock of the transmitter, the phase difference information being received from the transmitter.

DETAILED DESCRIPTION OF PREFERRED EMBODIMENTS OF THE INVENTION

Figures 1, 2:
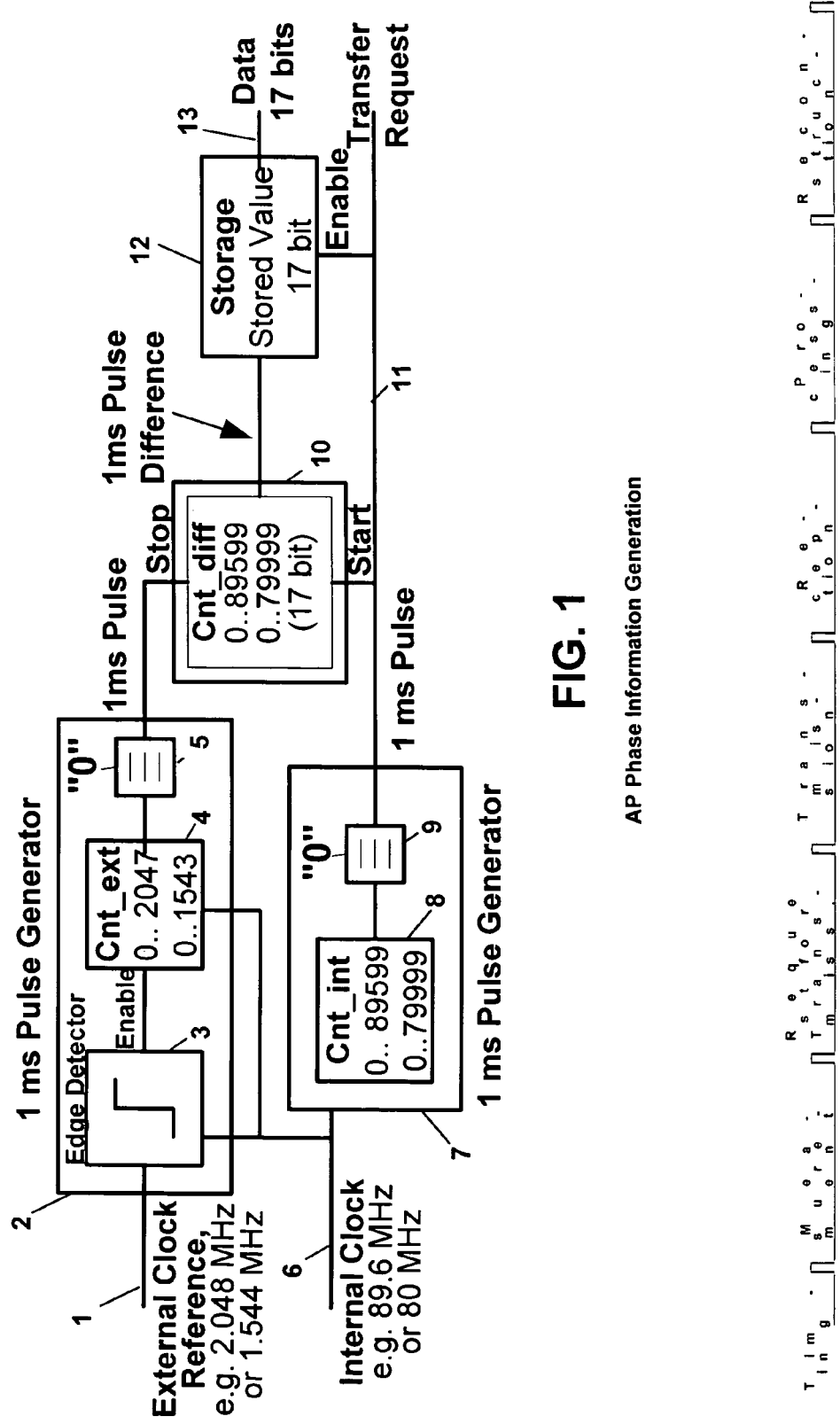
FIG. 1 shows a system for phase information generation, in accordance with an embodiment of the invention.
FIG. 2 illustrates a flow chart of a principle of transmission and reception timing sequence of pulses implemented in an embodiment of the invention such as a system, method or a device e.g. of a subscriber.

This invention is useful for all communication systems and methods, such as packet transporting radio systems (ATM and IP), where synchronization information is to be transferred.

With packet transport the data transmission is not necessarily continuous.

At least some of the embodiments of the invention include steps or means for measuring of the incoming phase and/or reconstructing of the synchronization clock source. The mechanism of multicast messages can be used for transmitting reconstruction information. The phase synchronization can be effected very quick, resulting in no or only small delay jitter. Consequently the filter times at the destination point are very short and need only minutes or seconds. This principle is feasible for e.g. packet based radio transmission.

In one or more of the preferred embodiments of the invention, a transmitter or transceiver TX transmits the absolute phase difference information between its internal symbol clock (e.g. 89.6 MHz) and an external clock reference (such as 2.048 MHz for ETSI or 1.544 MHz for ANSI) e.g. from a network. This information on the absolute phase difference is preferably transmitted to a receiver as a message, preferably encapsulated in a packet within the payload containing e.g. a multicast CID (AAL2 Channel Identifier).

The receiver symbol clock is locked to its original value, e.g. within the transmitter, over the (e.g. air) interface via symbol timing recovery, and together with the transmitted difference information about the absolute synchronization input phase, the receiver regenerates the clock reference, e.g. for use in upstream arranged equipment. The receiver preferably recovers exactly the location of the 1 ms pulses, and generates the clock signal under use of counters, which are reset by the recovered frame pulse.

The synchronization can now be transferred without being filtered beforehand, so the whole synchronization network is much more transparent.

The hardware implementation needs only a small number of logical elements, so it is very easy to implement or to adapt to different internal and external clocks.

The phase information is preferably provided in each frame, e.g. every 1 ms, using one packet per frame, but may also be sent less frequently, e.g. only every second or third frame or even less.

In accordance with a first embodiment of the invention, a synchronization system and method will be described, e.g. a radio communication system synchronization.

The aspects of Access Point (AP) implementation (generating and transmitting the synchronization information), Transfer Timing, Access Terminal (AT) Implementation (receiving the synchronization information and reconstructing the phase synchronization), and some specialities will be discussed below with reference to FIGS. 1 to 6. In the exemplary radio communication system an Access Point, AP, represents the end point of the connection which provides the synchronization information, and an Access Terminal, AT, represents an end point of the system, which receives the synchronization information.

Generally, the synchronization scheme according to this embodiment transmits the absolute phase information between the internal, e.g. 89.6 MHz, symbol clock and the external clock reference (e.g. 2.048 MHz for ETSI or 1.544 MHz for ANSI) as a message, e.g. encapsulated in a packet within the payload. The packet may contain a multicast CID. In this embodiment, the packet with synchronization (sync) information is transmitted once per frame, regardless where the packet is in that frame. The synchronization information consists of e.g. 17 bits+e.g. error coding. The packet size may be e.g. 6 bytes bigger. The packet may preferably be 4 QPSK modulated but can also be modulated according to a different scheme. In contrast to a concept of using a reserved timeslot, a scheduler is involved in synchronization transfer. The packaging as such is known and is not described here in detail.

The AT receiver clock, in this exemplary embodiment 89.6 MHz, is locked to the AP transmitter clock, e.g. 89.6 MHz, over the air interface via symbol timing recovery, and together with the information about the absolute synchronization input phase the receiver regenerates the clock information. To be exact the receiver recovers exactly the location of the 1 ms pulses. The clock signal is generated under use of counters, which are reset by the recovered frame pulse.

In the exemplary system with selected exemplary clock frequencies, the uncertainty of the reconstructed 1 ms pulses is 11 ns caused by the AP input sampling and additional 66 ns at maximum (with maximum clock deviation), caused by overtaking effects in the AT, resulting in about 77 ns in total.

FIG. 1 shows an embodiment of a system and method for generation of the AP phase information at a transmitter (AP), and for transmitting the synchronization information.

An incoming clock (external clock reference) of e.g. 2.048 or 1.544 MHz, is applied to an input 1 of a pulse generator 2 for generating a pulse of reduced frequency, e.g. every 1 ms, which pulse is synchronous to the external clock. The pulse generator 2 includes an edge detector 3 receiving the clock applied to input 1, a counter 4 connected to the output of detector 2, and an element 5 such as a comparator or AND gate. The edge detector 3 is a block sampling the input clock (e.g. a flipflop) and then comparing its value with the previous clock value. If the previous clock value is '0' and the new value is '1' it is a rising edge, and the output 'enable' is set for one clock cycle, which triggers the second counter 4. This leads to a fully synchronous design, because all involved blocks are running with the same clock. There is no asynchronous (different clocksystems) stage in between. An input of the element 5 is connected with the output of counter 4. Another input of the element 5 is supplied with a fixed value, e.g. "0". The element 5 generates a short output pulse of defined duration when the input values applied to its both inputs coincide, that is every 1 ms in this example.

The external clock applied to input 1 is sampled with an internal clock, e.g. 89.6 or 80 MHz, applied to an input 6. The internal clock is supplied to the edge detector 3 and also to counter 5. The sampled external clock is triggering the counter 5 (Cnt_ext), which counts e.g. 2048 events (0 to 2047, for a 2.048 MHz external clock) or 1544 events (0 to 1543, for a 1.544 MHz external clock), corresponding to 1 ms. The counter 5 is counting round rotating, that is the output count value starts from the initial value, e.g. 0, again after reaching its set maximum count value, e.g. 2047 or 1543.

The internal clock is applied to a pulse generator 7 generating a pulse of reduced frequency, e.g. every 1 ms (1 KHz), which pulse is synchronous to the internal clock. The output pulse frequencies of pulse generators 1, 7 are identical. The pulse generator 7 includes a counter 8 (Cnt_int) which counts the internal clock, and an element 9 such as a comparator or AND gate. An input of the element 9 is connected with the output of counter 8. Another input of the element 9 is supplied with a fixed value, e.g. "0". The element 9 generates a short output pulse of defined duration whenever the input values applied to its both inputs coincide, that is every 1 ms in this example. Element 9 may be identical or similar to element 5.

The counter 8 is counting round rotating, that is the output count value starts from the initial value, e.g. 0, again after reaching its set maximum count value, e.g. 89599 or 79999. In detail, the internal, e.g. 89.6 MHz, clock is also counted for 1 ms by setting the counter 8 to count 89600 (or 80000 clocks at 80 MHz internal clock) before restarting the count value from the initial value.

The internal clock, e.g. 89.6/80 MHz, itself is locked to a stable RF clock source of e.g. 20.48 MHz.

The output pulses of the pulse generators 2, 7 are generated e.g. every 1 ms, or at other appropriate cycle, e.g. due to zero crossing of counters 4, 8, triggering elements 5, 9 to output a pulse. The output pulse of the pulse generator 7 is applied, via a line 11, as a start impulse, to a start input of a counter 10 which serves as a 'difference'-counter Cnt_diff. The output pulse of the pulse generator 7 starts the counting operation of counter 10.

The output pulse of the pulse generator 2 is applied, as a stop impulse, to a stop input of the counter 10. The output pulse of the pulse generator 2 stops the counting operation of counter 10.

The counter 10 is set for counting up to a maximum count number corresponding e.g. to the number of pulses occurring within 1 ms at the internal clock (from 0 to 89599 at 89,6 MHz, or from 0 to 79999 at 80 MHz). The counter may be supplied with the internal clock pulses for counting, and thus counts the number of pulses of the internal clock occurring between the start and stop pulses. The counter 10 generates an output having a sufficient number of bits, e.g. 17 bits, for representing a count value of up to e.g. 89599.

When the count operation of the difference counter 10 is stopped due to the pulse supplied from pulse generator 2, e.g. at the zero crossing of counter 4, the difference counter 10 contains a count value which corresponds to the phase difference between the internal and external clock signals, actually the phase difference between both 1 ms output pulses (frame pulses) of the generators 2, 7.

This information on the phase difference between the internal and external clocks is stored in a register or storage 12 having a sufficient number of bits, e.g. 17 bits same as counter 10, and then transferred, from the storage 12, to the receiver side via an output 13. Line 11 is connected not only to the start input of difference counter 10 but also to an enable input of storage 12 and additionally serves as a transfer request line to supply a transfer request to or from the receiver. The output pulse of the pulse generator 7 applied to line 11 thus serves as a start impulse for starting the counting operation of the counter 10, as an enable impulse enabling the storage 12 to read in the output value of counter 10 and to provide this value at output 13 for transmittal to the receiver, and as a transfer request sent to the receiver for commanding the receiver to read and process the phase difference value stored in storage 12 and transmitted via output 13. The difference counter 10, the storage 12, and its data output 13 are working like a shift register, and might be replaced by a shift register. That means the data at output 13 being transferred are delayed and may already be up to 2 ms old. This leads to an absolute delay, which does not cause problems but is of advantage in that it saves implementation of different enable pulses (1 ms pulses 11). The difference counter block 10 is started with the 1 ms pulse generated by element 9. At the same time its old value is given to the storage 12 and the old value of the storage 12 becomes data output at output 13.

To guarantee correct values at the receiver side a Forward Error Correction, FEC, circuit or function may be provided. The MS (most significant) bit is, preferably, transmitted first. The handover to the scheduler may be controlled by the existing AP TX (transmitter) frame counter.

The difference between the 1 ms pulses is not fixed, because the internal and external clocks are not locked to each other. Depending on the drift direction, the difference is growing or decreasing steadily, which leads to overtaking effects.

FIG. 2 shows a preferred example of a Transfer Timing. The timing diagram of FIG. 2 shows the principle sequence of the transmission and reception timing sequence of the AP and AT pulses, that is how the information is measured and transferred to the receiver (AT). The absolute delay of the phase transfer does not matter. FIG. 2 illustrates the timing of pulses of e.g. 1 ms which may correspond to the output pulses of pulse generator 7. The intervals are used for measurement, request for transmission, transmission, reception, processing, and reconstruction. FIG. 2 shows only one timing sequence. Actually the sequences are overlapping each other, so each step is done in every frame, but for a different sequence. If necessary additional steps may be inserted, but the total number of steps in a sequence is kept constant all the time so as to maintain synchronization.

Figure 3:
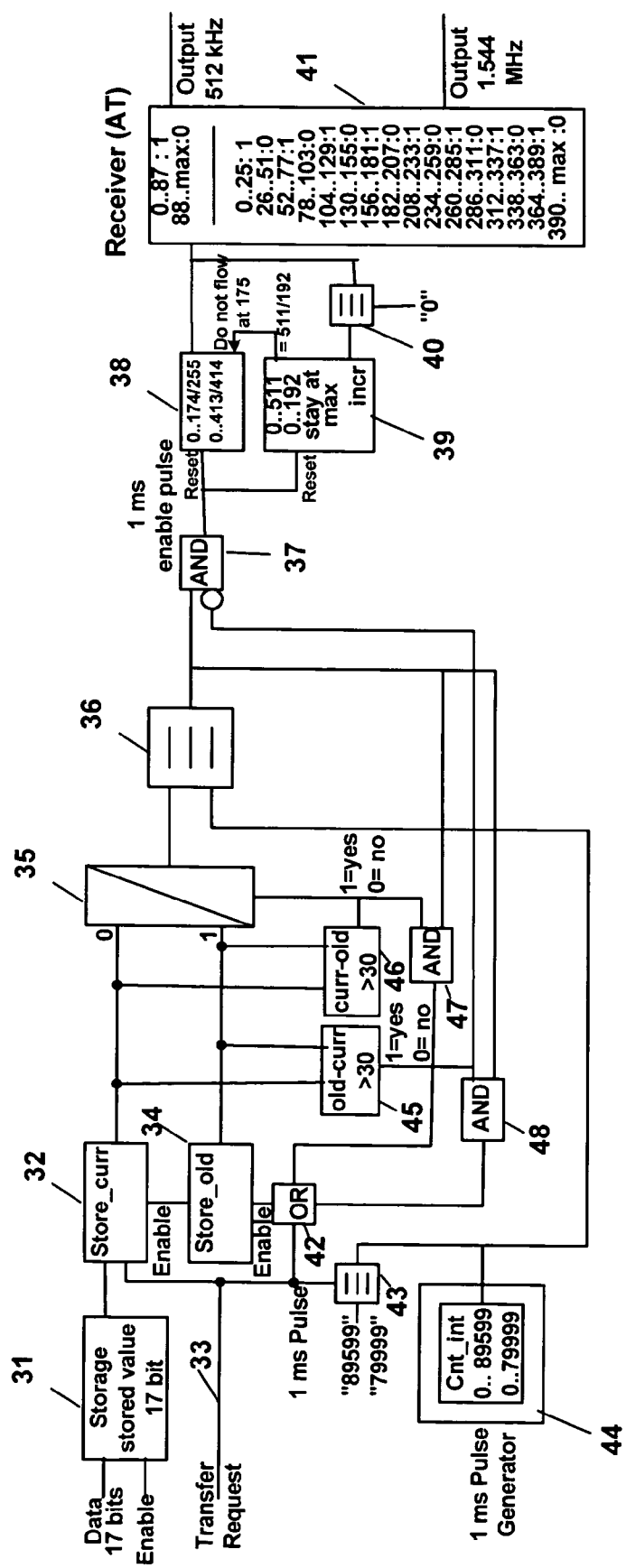
FIG. 3 illustrates a block diagram of a receiver representing a further embodiment of the invention.

FIG. 3 shows an embodiment, in the form of a block diagram, of a receiver clock generator structure receiving the synchronization information for clock resynchronization.

The receiver produces, at a clock output stage 41, 512 kHz/1.544 MHz clocks, and can reconstruct the 1 ms frame pulses exactly, because this information is transmitted every 1 ms.

Normally the reconstruction is pretty easy. The receiver just compares, by a comparator 36, the count value of an internal counter 44 running e.g. with 89.6 or 80 MHz, with the transferred phase difference value of the transmitter. If they are equal, a pulse is generated by comparator 36, and the phase difference between the zero crossing of the internal counter 44 and this pulse is exactly the transmitted pulse difference. The internal counter 44 may be triggered by the incoming data stream for symbol clock recovery and is set to a maximum value of e.g. 89599 or 79999 so as to count, in a round-rotating manner, each full count cycle within 1 ms.

The pulse of the comparator 36 is triggering clock generation counters 38, 39, which control each other. Both counters 38, 39 are reset with this pulse. The upper counter 38 is running with 89.6 or 80 MHz round rotating (from 0 . . . 174/255, or 0 . . . 413/414 for the different frequencies) and triggering the lower counter 39 to increase, from 0 . . . 511, or 0 . . . 192 for the different frequencies, the count value thereof by "1" with each zero crossing of the counter 38. A comparator 40 compares the count value of counter 38 with a preset value, e.g. "0", and generates an increase pulse for the counter 39 at each coincidence. When the lower counter 39 reaches its max value, e.g. 511 or 192, it stays at this value until the next reset pulse is received from AND gate 37, and generates an output signal applied to the upper counter 38, inhibiting the upper counter to continue counting. In this case, the upper counter 38 is no longer counting or rotating but waits for the next pulse-trigger from AND gate 37 resetting it. The maximum value of the lower counter 39 is set to correspond to the number of rounds of the upper counter 38 necessary for generating the necessary reaches its max value, A clock generating output stage 41 of the receiver is generating the "0" and "1" levels of the output pulses output at "Output 512 kHz" and/or at "Output 1.544 MHz" depending on the actual count value of counter 38 applied to the input of the clock generating stage 41. The correspondence between the signal levels of the output pulses of stage 41 and the count values of the counter 38 is listed within block 41. As an example, level "1" is generated for the output pulse 512 kHz for a count value range of counter 38 from 0 . . . 87, and level "0" for count values from 88 . . . max, etc.

The provision of counter 39 provides the advantage that both the counter 38 and the clock generating stage 41 need to be implemented only for a reduced number of maximum count value and input/output signal states, respectively.

Figure 4:
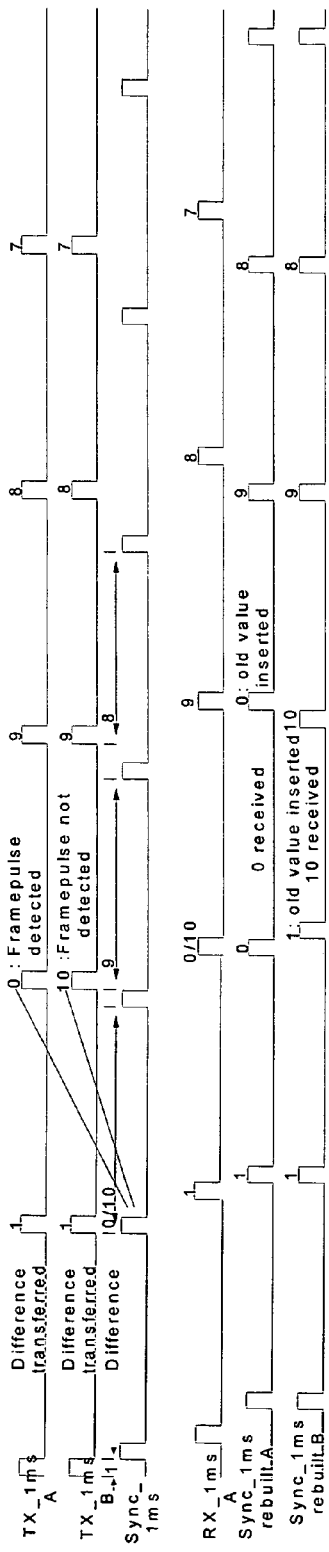
FIG. 4 shows a timing diagram with decreasing frame pulse difference.

The special cases of overtaking must be treated separately. In case the difference between the external and internal clocks of the transmitter is steadily decreasing the difference will change from low to high value in case the 1 ms pulses are 'overtaking' each other. This is shown in FIG. 4 which illustrates a timing diagram with decreasing frame pulse difference. For a better overview the frame has only 10 cycles and less steps per transfer sequence.

A general problem with the transmission of the difference is the update timing. At that moment the already existing (old) value is being overwritten with the current difference. Here the roundrotating border, (max value to 0 and vice versa), is the main issue. It may happen that the 'old' difference is 1, but (with decreasing difference) the next difference is not 0, but max value again (here 10) and no sync pulse would be generated.

Therefore this one pulse is generated with the old value 1, and the next pulse is then generated correctly again with 10 (Sync__1ms_rebuilt_B).

A similar situation occurs when the difference 0 changes to 9. Then the comparison with zero would not be successful, because the received difference has changed already to 9. Therefore a pulse is generated with the 'old' difference 0 (Sync__1ms_rebuilt_A).

Thus, when overtaking, the value changes from 0 to 10 or from 0 to 9, depending on the sampling point. In the receiver this would lead to a huge gap. For avoiding this gap, the pulse, output from comparator 36, is generated, in this case, based on the old value.

If the difference is increasing, a similar problem happens. A pulse is generated with an 'old' value and the updated value may be 'old+1'. Then a new pulse is generated immediately after the first one. (Or, depending on the detection (0 or 10) there is one gap in between. In these cases, the second pulse must be masked.

The phase difference value, received from the transmitter as output from storage 12 (FIG. 3) is temporarily stored in a storage buffer or register 31 and then transferred into a register or storage 32 for storing therein as current phase difference value. A further register or storage 34 is provided for storing the previous phase difference value. Before storing a new phase difference value into the storage 32, the content thereof is transferred to storage 34 and now serves as previous phase difference value. That is both the actual phase difference value and the previous phase difference value, which was the actual phase difference value valid in the immediately preceding cycle are provided in parallel. A selector 35 selects either the actual phase difference value of the storage 32 or the previous current phase difference value of storage 34 depending on the level of a binary control signal applied to its control input (shown at the bottom of selector 35 according to FIG. 3; e.g. "0" selecting the value of storage 32; "1" selecting the value of storage 34).

The binary control signal applied to selector 35 is generated by a comparator element 46 which forms the difference between the two actual output values of the storages 32 and 34 "current value−old value", and compares this difference with a threshold value, e.g. 30. When the difference is greater than the threshold value, the element 46 generates, as the binary control signal, a binary output level controlling the selector 35 to select the output ("old value") of storage 34, e.g. "1"; otherwise, the element 46 generates the other binary value for selecting the actual phase difference value of storage 32, e.g. "0".

The "Greater Than" decision of element 46 detects when overtaking takes place, and ensures a pulse with the old value. The old pulse value stored in storage 34 is applied to comparator 36, via selector 35, for generating the output pulse of comparator 36 based on the old pulse value. The next pulse is then generated with the new received value. The uncertainty by generating the clock signal based on old information may cause half the receiver jitter, about 33 ns. The receiver jitter is linear with the absolute deviation between internal 89.6/80 MHz and external synchronization source 2.048/1.544 MHz.

Figure 5:
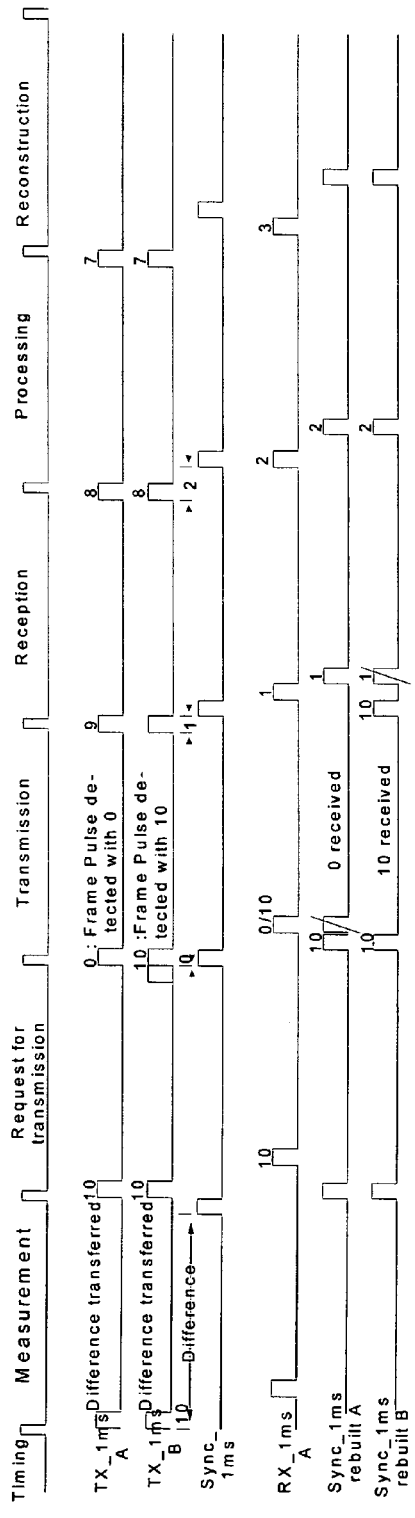
FIG. 5 shows a timing diagram with increasing frame pulse difference.

Overtaking may happen as well in the other, increasing, direction. In this case two pulses would be send within a short period. To prevent this case the old value is sent and the freshly transferred value is ignored. This can be seen in FIG. 5. FIG. 5 shows a timing diagram with increasing frame pulse difference.

As shown in FIG. 3, a comparator element 45, similar to comparator element 46, is provided which forms the difference between the two actual output values of the storages 32 and 34 "old value−current value", and compares this difference with a threshold value, e.g. 30. When the difference is greater than the threshold value, the element 45 generates, as a binary control signal, a binary output level controlling an AND gate 37 into the blocking state in which it suppresses application of the output pulse of comparator 36 to the reset inputs of counters 38, 39. In detail, the output signal of the element 45 is applied to an inverting input of the AND gate 37 to which non-inverting input the output of comparator 36 is applied. The comparator 36 compares the output value of selector 35 and the actual count value of counter 44 applied to its inputs, and generates an output pulse when both input values coincide. Normally, when the difference "old value−current value", is smaller than the threshold value, e.g. 30, the element 45 generates, as a binary control signal, a binary output level continuously opening AND gate 37 so that the pulses generated by comparator 36 can pass the AND gate 37.

The output signal of comparator 36 is applied to one input each of AND gates 47, 48, receiving the output signals of comparator 46 and 45, respectively, as their other input. The outputs of the AND gates 47, 48 are applied to an OR gate 42 which receives the output of comparator element 43 as a further input, and passes each input "1" to an enable input of storage 34, triggering the latter to read in the actual value from storage 32.

Hence, for both overtaking directions it is common that the 'old'-storage or register 34 is loaded with the current value, from storage or register 32 after the equal condition of comparator 35 becomes true.

Comparator element 43 compares the actual count of round-rotating counter 44 with a defined value, e.g. 89599 or 79999, and generates an output pulse when coincident. The output pulses of comparator element 43 occur with reduced frequency of the internal clock, e.g. each 1 ms. The counter 44 counts the pulses of an internal clock, e.g. 80 MHz or 89.6 MHz e.g. from 0 . . . 79999, or 0 . . . 89599, depending on the frequency of the internal clock so as to complete a count round e.g. each ms. Elements 43, 44 form a pulse generator or frequency divider which reduces the frequency of the internal clock to e.g. 1 kHz. The output pulses of the pulse generator, that is of element 43, serve as enable pulses applied to the storages 32, 34 for triggering the storages to store the actual input values, and furthermore as transfer request transmitted to via output 33 to the transmitter (FIG. 1).

The overtaking can be detected with the zero and max value, therefore the overtaking check is preferably performed with 0.

The synchronization systems and methods according to the invention can be implemented in parallel to existing data transmission implementation. The synchronization can be made selectable so that, in case of no synchronization transfer the whole mechanism can be switched off.

The synchronization systems and methods according to the invention can preferably be implemented in such a manner that the ANSI and ETSI modes are selectable. For this, the 89.6/80 MHz clocks are additionally able to be synchronized to the 20.48 MHz path in AP. Preferably a multiplexer is provided in the 2.048 MHz line, switching between the 2.048 MHz input and the divided 20.48 MHz input. The synchronization output is switchable between 512 kHz output and the 512 kHz/1.544 MHz clock. To prevent from missing pulses or spikes in the input synchronization source (2.048/1.544 MHz), a threshold filter is preferably implemented, checking the input signal for right range. The same existing threshold as for input filtering may be used. As long as the input signal is between 43 and 44/51 and 52 89.6/80 MHz samples between two rising edges it is valid, else the measurement is ignored, and a pulse is generated at sample 44/52 with 89.6/80 MHz clock, saving the input phase. If input fails for a several number of events, "all-ones" shall be transmitted, to indicate synchronization error to the receiver. If the receiver receives "all-ones" it shall squelch the synchronization output.

Receiver protection against bit errors may be provided to ensure proper transfer of the synchronization information. The numbers for ANSI are calculated values, yet.

The following gives an overview about additionally provided optional activities.

At Initialization:
Software, SW, assigns a CID for transferring 2 MHz clock phase information;
SW writes the CID value to ASIC register in AP and in all necessary terminals;
SW defines a multicast group that contains the terminals that need 2 MHz clock. In practice it may be implemented by configuring the same downlink transport CID for all terminals in the group.

Operation:
1) AP ASIC generates the 2 MHz clock phase information.
2) Phase information is written to a register. Old value is overwritten when new is ready.
3) AP scheduler SW writes downlink frame controls to Tx RAM. The scheduler SW takes care that every frame one Packet Data Unit, PDU, is sent for the "2M CID". PDU length is set suitable for the phase information.
4) AP ASIC MAC block reads Tx RAM and checks for every PDU if it is for the 2M CID.
5) If burst is for 2M CID, then (instead of requesting data from DBUF) the AP MAC reads payload from the 2M phase register.

The value written by SW may be kept. Other possibility for SW control is to give SW write access to the phase information register. Also read access may be used, e.g. for test purposes.

6) When AT MAC receives a PDU for 2M_CID, AT MAC, instead of passing the payload to DBUF, writes the payload to a register. Previous value of the register is overwritten.
7) AT ASIC reads the phase information at regular intervals from the register and uses it to control the 2M reference clock frequency.

Figure 6:
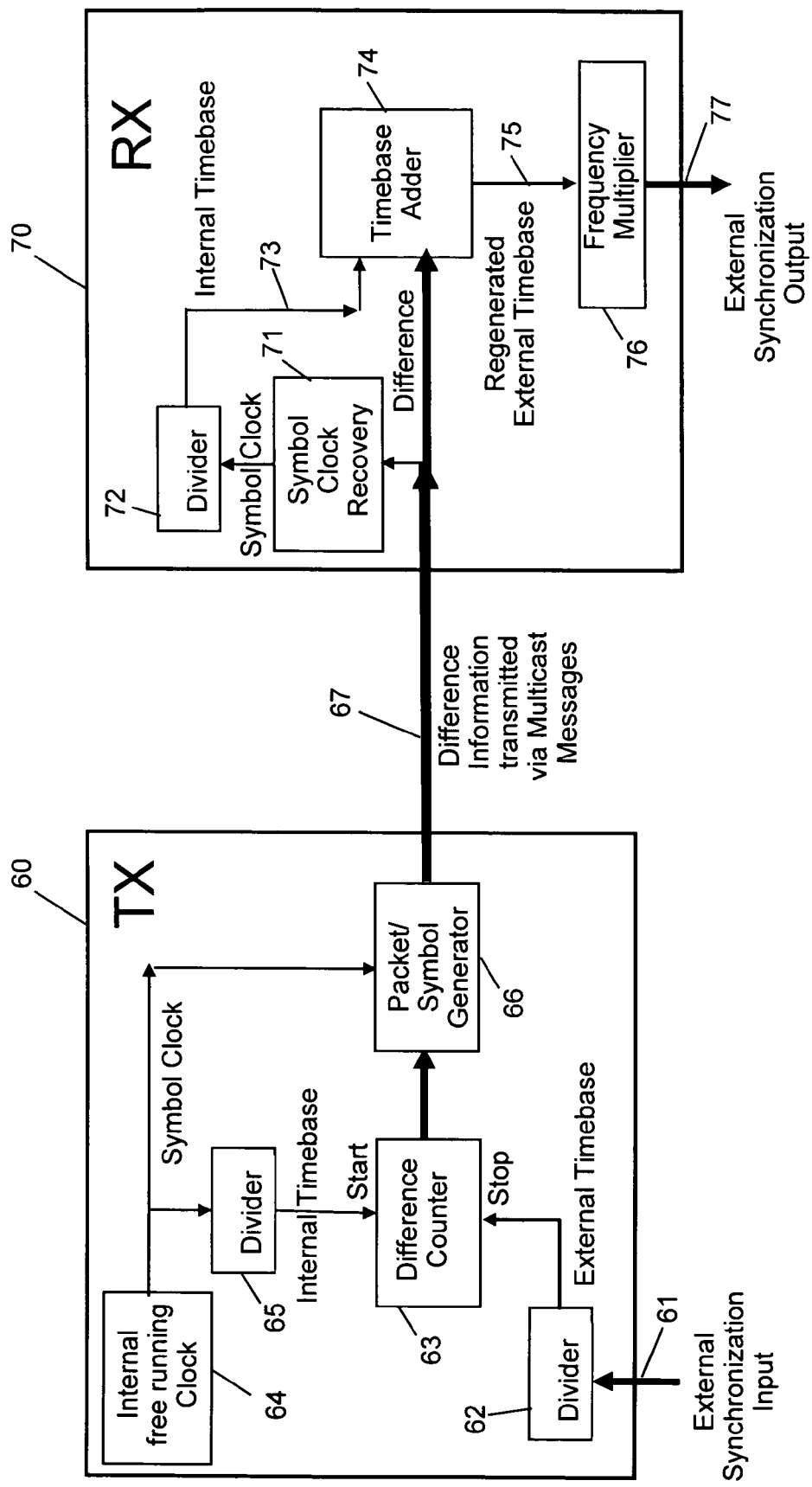
FIG. 6 shows a block diagram of an embodiment of a system for phase information generation, transmission and reconstruction in accordance with the invention.

Changes provided in ASIC:
1) 2M phase information generation block (used in AP),
2) 2M phase control block (used in AT),
3) Register for phase information:
   In AP it is written by the phase info generation block and read by Tx MAC.
   In AT it is written by Rx MAC and read by 2M phase control block.
   Double sized register may be used to prevent reading and writing same time,
   SW may be given read and write access for test purposes.
4) Register for the phase information CID
   Written by SW
   In AP it is read by Tx MAC, in AT by Rx MAC.
5) Changes in Tx and Rx MAC block for handling the phase info CID payload.
   AP Tx MAC is preferably adapted to recognize the 2M CID from PDU headers in TX_RAM and take payload from the register,
   AT Rx MAC is preferably adapted to recognize the 2M CID from received PDU headers and put payload in the register FIG. 6 shows a basic block diagram of an embodiment of a system in accordance with the invention, for illustrating the principle flow of synchronization transmission via multicast messages in packet based radios.

The internal time bases of transmitter 60 and receiver 70 may be smaller or larger than the external time bases because both clock sources are not synchronized to each other.

The transmitter, TX, 60 includes a divider 62 to which an external synchronization input 61 is applied and which generates an external timebase of e.g. 1 ms. The external timebase is phase-locked to the external synchronization input 61. The external synchronization input 61 preferably corresponds to the external clock reference 1 shown in FIG. 1. The divider 61 is a frequency divider, which preferably corresponds to pulse generator 2 of FIG. 1. The pulses of the external timebase generated by divider 62 occur with a fixed frequency of e.g. 1 kHz, and are applied to a stop input of a difference counter 63, which preferably corresponds to counter 10 of FIG. 1.

The transmitter 60 further includes an internal free running clock 64, which generates the symbol clock with appropriate frequency of e.g. 89.6 or 80 MHz. The symbol clock is applied to a divider 65 generating an internal timebase of the same frequency, and preferably the same pulse shape, as the external timebase but with possible phase shift. The internal timebase is phase-locked to the internal clock and symbol clock. The symbol clock generated by clock generator 64 corresponds to internal clock 6 of FIG. 1, and is applied to the stop input of counter 63. The divider 65 corresponds to pulse generator 7 of FIG. 1.

The output signal of difference counter 63 represents the phase difference value between the internal and external timebase, and is applied to a packet and/or symbol generator 66, which additionally receives the symbol clock generated by internal clock generator 64. The packet and/or symbol generator 66 generates packets and/or symbols which include the information on the phase difference between the internal and external timebase and thus between the internal and external clocks.

The phase difference information is transmitted to at least one, preferably a plurality of receivers 70, preferably via multicast messages 67 so as to be taken in, and evaluated, by some or all receivers 70 receiving messages from the transmitter 60.

The receiver, RX, 70 includes a Symbol Clock recovery means 71, which receives the incoming symbol stream and recovers the symbol clock therefrom. The recovered symbol clock is applied to a divider 72, which generates therefrom an internal timebase 74 of e.g. 1 ms, that is 1 kHz. The internal timebase 74, and the phase difference transmitted via the messages 67, are applied to a timebase adder 74, which generates from these inputs a regenerated external timebase 75 of e.g. 1 ms.

The regenerated external timebase 75 is applied to a frequency multiplier 76, which multiplies the regenerated external timebase by an appropriate factor, and outputs an external synchronization output 77.

Elements 71, 72 of FIG. 6 may correspond to elements 44, 43 of FIG. 1. Element 74 of FIG. 6 essentially corresponds to elements 31 to 37, 42, and 45 to 48 of FIG. 1. Element 76 of FIG. 6 may at least partly correspond to elements 38 to 41 of FIG. 1. Modulators/demodulators are not shown in FIG. 6.

Although preferred embodiments have been described above, the invention is not limited thereto and may also be implemented in other ways, e.g. by combining, in any arbitrary fashion, one or more features of one or more embodiments with one or more features of other embodiments. Also, the selected frequencies have only been provided for sake of example, and should not be considered as restrictive. Other frequencies may be used, too.

The invention claimed is:

1. A method comprising:
   receiving from a transmitter, by a receiver, transmitted phase difference information indicating a phase difference between an internal clock and an external clock of the transmitter;
   generating, by the receiver, a clock signal dependent on the phase difference information
   generating, by the receiver, a receiver internal clock by recovering the internal clock of the transmitter from information received from the transmitter;
   frequency-dividing, by the receiver, the receiver internal clock;
   storing, by the receiver, at least two successive values of the phase difference information received from the transmitter;
   detecting, by the receiver, a difference between the at least two successive values of phase difference information; and
   adjusting, by the receiver, the phase of the frequency-divided clock based on the detected difference.

2. The method according to claim 1, wherein the internal clock and the external clock are frequency-divided within the transmitter to the same frequency, the method further comprising converting the phase difference between the frequency-divided clocks to a numerical value to be transmitted to the receiver.

3. The method according to claim 2, further comprising applying pulses of the frequency-divided clocks to start and stop inputs of a counter which generates the numerical value to be transmitted to the receiver.

4. The method according to claim 1, further comprising transmitting the phase difference information to the receiver in the form of multicast packets.

5. The method according to claim 1, wherein the internal clock is a symbol clock of 80 MHz or 89.6 MHz, and the external clock is an external clock reference of 2.048 MHz or 1.544 MHz.

6. The method according to claim 1, further comprising multiplying, by the receiver, the frequency of the adjusted frequency-divided clock for generating a frequency multiplied receiver external clock.

7. The method according to claim 6, wherein a receiver external clock is generated from the phase adjusted frequency-divided clock by first counting, in a round-rotating manner, a high frequency signal, and second counting the number of rounds of the first counting, the second counting inhibiting the first counting from further counting when reaching a preset value.

8. The method according to claim 1, comprising:
   selecting, by the receiver, depending on the difference between the at least two successive values of phase difference information, one of the stored values of the phase difference information for adjusting the phase of the frequency-divided clock.

9. The method according to claim 1, comprising:
   suppressing, by the receiver, depending on the difference between the at least two successive values of the phase difference information, generation of a second pulse within one period of the frequency-divided clock.

10. A system comprising:
    a transmitter comprising a phase difference information generator configured to generate phase difference information indicating a phase difference between an internal clock and an external clock, and a transmitter configured to transmit the phase difference information to a receiver; and
    the receiver comprising a phase receiver configured to receive the phase difference information indicating the phase difference between the internal clock and the external clock, a clock generator configured to generate a clock signal dependent on the transmitted phase difference information, a generator configured to generate a receiver internal clock by recovering the internal clock of the transmitter from information received from the transmitter, a frequency-divider configured to frequency-divide the receiver internal clock, a storage configured to store at least two successive values of the phase difference information received from the transmitter, a detector configured to detect a difference between the at least two successive values of phase difference information and an adjuster configured to adjust the phase of the frequency-divided clock based on the detected difference.

11. The system according to claim 10, wherein the transmitter further comprises:
    a frequency divider configured to frequency divide the internal clock and the external clock to the same frequency; and a converter configured to convert the phase difference between the frequency-divided clocks to a numerical value to be transmitted to the receiver.

12. The system according to claim 11, wherein the converter comprises a counter which generates the numerical value to be transmitted to the receiver, the counter having start and stop inputs to which pulses of the frequency-divided clocks are applied.

13. The system according to claim 10, wherein the phase difference information is transmitted to the receiver in the form of multicast packets. detected difference.

14. The system according to claim 10, wherein the internal clock is a symbol clock of 80 MHz or 89.6 MHz, and the external clock is an external clock reference of 2.048 MHz or 1.544 MHz.

15. The system according to claim 10, wherein the receiver further comprises a multiplier configured to multiply the frequency of the adjusted frequency-divided clock for generating a frequency multiplied receiver external clock.

16. The system according to claim 15, wherein the receiver further comprises a clock generator stage configured to generate a receiver external clock from the phase adjusted frequency-divided clock, wherein the clock generator stage comprises a first counter for counting, in a round-rotating manner, a high frequency signal, and a second counter for counting the number of rounds of the first counter, the second counter inhibiting the first counter from further counting when the first counter reaches a preset value.

17. The system according to claim 10, wherein the receiver further comprises:
a selector configured to select, depending on the difference between the at least two successive values of the phase difference information, one of the stored values of the phase difference information for adjusting the phase of the frequency-divided clock.

18. The system according to claim 10, wherein the receiver further comprises:
a suppressor configured to suppress, depending on the difference between the at least two successive values of the phase difference information, generation of a second pulse within one period of the frequency-divided clock.

19. An apparatus comprising:
a receiver configured to receive, from a transmitter, transmitted phase difference information indicating a phase difference between an internal clock and an external clock of the transmitter;
a clock generator configured to generate a clock signal dependent on the phase difference information transmitted from the transmitter
a generator configured to generate a receiver internal clock by recovering the internal clock of the transmitter from information received from the transmitter;
a frequency-divider configured to frequency-divide the receiver internal clock;
storages for storing at least two successive values of the phase difference information received from the transmitter;
a detector configured to detect a difference between the at least two successive values of the phase difference information; and
an adjuster configured to adjust the phase of the frequency-divided clock based on the detected difference.

20. The apparatus according to claim 19, further comprising a multiplier configured to multiply a frequency of a receiver external clock for generating a frequency multiplied receiver external clock.

21. The apparatus according to claim 19, further comprising a clock generator stage configured to generate a receiver external clock from the phase adjusted frequency-divided clock, the clock generator stage comprising a first counter for counting, in a round-rotating manner, a high frequency signal, and a second counter for counting the number of rounds of the first counter, the second counter inhibiting the first counter from further counting when the first counter reaches a preset value.

22. The apparatus according to claim 19, comprising:
a selector configured to select, depending on the difference between the at least two successive values of the phase difference information, one of the stored values of the phase difference information for adjusting the phase of the frequency-divided clock.

23. The receiver according to claim 19, comprising:
a suppressor configured to suppress, depending on the difference between the at least two successive values of the phase difference information, generation of a second pulse within one period of the frequency-divided clock.

24. A method, comprising:
receiving from a transmitter, by a receiver, a transmitted phase difference information indicating a phase difference between an internal clock and an external clock of the transmitter;
generating, by the receiver, a clock signal dependent on a received phase difference information indicating a phase difference between the internal and the external clock of the transmitter, the phase difference information being received from the transmitter;
generating, by the receiver, a receiver internal clock by recovering the internal clock of the transmitter from information received from the transmitter;
frequency-dividing, by the receiver, the receiver internal clock;
storing, by the receiver, at least two successive values of the phase difference information received from the transmitter;
detecting, by the receiver, a difference between the at least two successive values of phase difference information; and
adjusting, by the receiver, the phase of the frequency-divided clock based on the detected difference.

25. A system comprising:
a transmitter comprising a phase difference information generating means for generating phase difference information indicating a phase difference between an internal clock and an external clock, and transmitting means for transmitting the phase difference information to a receiver; and
the receiver comprising a receiving means for receiving the phase difference information indicating a phase difference between the internal clock and the external clock, a clock generator means for generating a clock signal dependent on the phase difference information, generating means for generating a receiver internal clock by recovering the internal clock of the transmitter from information received from the transmitter, frequency-dividing means for frequency dividing the receiver internal clock, storing means for storing at least two successive values of the phase difference information received from the transmitter, detecting means for detecting a difference between the at least two successive values of phase difference information and adjusting means for adjusting the phase of the frequency-divided clock based on the detected difference.

26. An apparatus, comprising:

a receiving means for receiving, from a transmitter, a phase difference information indicating a phase difference between an internal clock and an external clock;

a clock generator means for generating a clock signal dependent on the phase difference information;

generating means for generating a receiver internal clock by recovering the internal clock of the transmitter from information received from the transmitter;

frequency-dividing means for frequency dividing the receiver internal clock;

storing means for storing at least two successive values of the phase difference information received from the transmitter;

detecting means for detecting a difference between the at least two successive values of phase difference information; and adjusting means for adjusting the phase of the frequency-divided clock based on the detected difference.

* * * * *